Nov. 20, 1951  B. W. BENDER  2,575,378
DIE CUTTING BLOCK
Filed Jan. 8, 1948

INVENTOR.
BYRON W. BENDER
BY Robert J. Patterson
ATTORNEY

Patented Nov. 20, 1951

2,575,378

UNITED STATES PATENT OFFICE 2,575,378

DIE CUTTING BLOCK

Byron W. Bender, Ridgewood, N. J., assignor to United States Rubber Company, New York, N. Y., a corporation of New Jersey Application January 8, 1948, Serial No. 1,248

2 Claims. (Cl. 164—58)

This invention relates to improved die cutting blocks and more particularly to die cutting blocks which are molded from the plastic composition disclosed below and which are greatly superior to die cutting blocks available heretofore.

As is well-known in the art the purpose of a die cutting block is to provide a hard, tough, durable surface on which sheets of leather, fabric, rubber, etc. are positioned for die cutting. In die cutting a die made from a steel knife set on edge and shaped to the desired configuration is forced under high pressure against the piece of material placed upon the die cutting block. It will be apparent that die cutting blocks must be capable of withstanding extreme conditions of use. In the past die cutting blocks have often been made from wood such as from maple wood but wear of such blocks has been excessive and they have been subject to other disadvantages which are overcome by the use of die cutting blocks made in accordance with my invention. Attempts have been made to use other materials in place of wood for the construction of these blocks, examples of such other materials being rubber-impregnated cellulose fiber sheets, vulcanized fiber, hard rubber, gutta-percha, etc. but die cutting blocks made from such materials have not possessed the necessary properties required to stand up under use. So far as I am aware, no material which has been heretofore proposed for the manufacture of die cutting blocks has possessed the necessary combination of sufficient hardness and toughness to resist the cutting tendency of the die without at the same time possessing excessive brittleness resulting in a tendency to chip and exhibiting a dulling action upon the die.

The principal object of my invention is to provide a die cutting block which overcomes the foregoing disadvantages of other die cutting blocks. Another object is to provide a die cutting block which gives cleaner cutting at lower cutting pressures resulting in increased speed and production with consequent increase in the earning ability of piece workers. Another object is to provide such a block which greatly reduces the necessity for recutting and trimming and also reduces the number of rejects. Another object is to provide a die cutting block which eliminates the necessity for periodic refinishing of the surface of the die cutting block. In the case of wood blocks frequent refinishing is necessary as a result of the uneven wearing down of the blocks when in service. Many other objects and advantages of the present invention will appear more fully hereafter.

Figure 1:
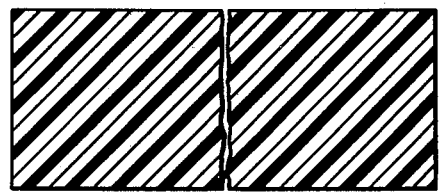
Figure 2:
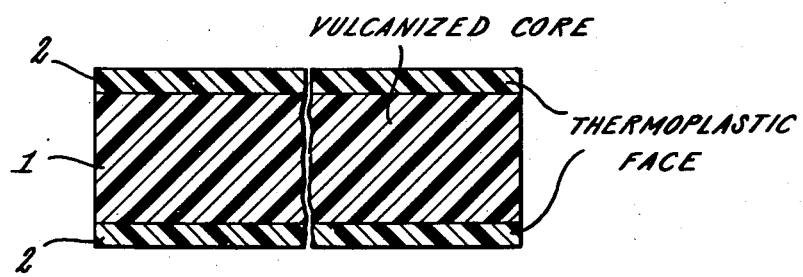

In the accompanying drawing Fig. 1 is a vertical section through a die cutting block made in accordance with my invention; Fig. 2 is a similar view of a modification.

I have discovered that greatly improved die cutting blocks may be made from a mixture of a rubbery interpolymer of butadiene and either styrene or acrylonitrile and a hard normally inelastic resinous thermoplastic interpolymer of a major proportion of styrene and a minor proportion of butadiene or acrylonitrile or both butadiene and acrylonitrile. Such a composition, and particularly the blend of a rubbery interpolymer of butadiene and acrylonitrile and a hard normally inelastic resinous thermoplastic interpolymer of a major proportion of styrene and a minor proportion of acrylonitrile, is a uniquely suitable material from which to manufacture molded die cutting blocks. This composition has such outstanding physical properties that the die cutting blocks made therefrom require absolutely no reinforcement and may be made in a single integral piece in a single molding operation. The die cutting blocks of the present invention are simple and economical to manufacture and at the same time have very outstanding qualities as compared with die cutting blocks of the prior art.

The rubbery interpolymer used in making the die cutting blocks of my invention may be any elastomeric interpolymer of butadiene and either styrene or acrylonitrile or both, such rubbery interpolymers being available commercially as synthetic rubbers of the types known as Buna S or GR-S and Buna N. As is well-known, Buna S or GR-S is a rubbery interpolymer made by the emulsion polymerization of 1,3-butadiene and styrene, the proportions of combined monomers therein usually ranging from 70 to 80 percent butadiene and correspondingly from 30 to 20 percent styrene and more commonly approximating 75 percent butadiene and 25 percent styrene. Buna N is a rubbery interpolymer of 1,3-butadiene and acrylonitrile likewise made by emulsion polymerization, the proportion of acrylonitrile combined therein generally ranging from 18 to 40 percent and the proportion of butadiene correspondingly ranging from 82 to 60 percent. Such rubbery interpolymers may be designated as interpolymers of a major proportion of butadiene and a minor proportion of a compound having the general formula $CH_2=CH-X$ where $X$ is either phenyl or CN.

The preferred die cutting blocks of my invention are made from a blend of elastic synthetic rubber of the Buna N type and a hard normally inelastic resinous thermoplastic interpolymer of a major proportion of styrene and a minor proportion of acrylonitrile, with or without a minor proportion of butadiene, the proportions of combined monomers in such resinous interpolymer ranging from 65 to 80 percent of styrene, from 20 to 35 percent of acrylonitrile and from 0 to 15 percent of butadiene. This rubbery interpolymer and this resinous interpolymer are completely compatible with one another so that a uniform blend thereof is readily attained.

Less preferably, die cutting blocks of the present invention are made from blends of a rubbery interpolymer of butadiene and styrene and a hard normally inelastic resinous thermoplastic interpolymer of a major proportion of styrene and a minor proportion of butadiene as the sole monomeric constituents, there commonly being employed in the manufacture of the latter from 70 to 97 percent by weight of styrene and correspondingly from 30 to 3 percent by weight of butadiene. More commonly the proportions of combined monomers in the hard inelastic interpolymer range from 75 to 95 percent of styrene and correspondingly from 25 to 5 percent by weight of butadiene. Such resinous styrene-butadiene interpolymers are completely compatible with rubbery butadiene-styrene interpolymers but the die cutting blocks made from the resulting mixtures do not exhibit the advantages of those made as described in the preceding paragraph to the same degree although they are considerably better than prior art die cutting blocks.

If desired, a minor proportion of acrylonitrile, say up to 20% by weight of the monomers combined in the resinous styrene-butadiene interpolymer, may be used in making the same. However, as the proportion of acrylonitrile in the styrene-butadiene resinous interpolymer increases, the compatibility thereof with the rubbery interpolymer of butadiene and styrene tends to decrease. For this reason, it is often preferred that the proportion of combined acrylonitrile in the resinous styrene-butadiene interpolymer be low, say not over 5 percent of the monomers, when it is employed in conjunction with a butadiene-styrene rubbery interpolymer.

In some cases, it may be desirable to employ as the rubbery component in practicing the present invention an elastomeric ternary interpolymer of a major proportion of butadiene and minor proportions of both styrene and acrylonitrile. Such a ternary rubbery interpolymer presents the advantage over the binary butadiene-styrene rubbery copolymer that it exhibits increased compatibility with ternary resinous interpolymers of styrene, butadiene and acrylonitrile such as are described herein.

The elastic synthetic rubber component of the mixtures employed in accordance with my invention has an ultimate elongation of at least 150 percent while the relatively inelastic hard resinous component has an elongation of less than 10 percent and is brittle. Blending of these two widely different types of interpolymers with one another gives a mixture which is ideally adapted to the manufacture of die cutting blocks which are desirably hard but not brittle and which are tough enough to resist the cutting tendency of the die over long periods of time and which give other advantages including cleaner cutting, reduction in the cutting pressure required, etc.

The normally hard inelastic resinous thermoplastic interpolymer used in accordance with my invention may be made by the same general procedure that is used in making a rubbery Buna S or Buna N, namely by emulsion polymerization, but using a major proportion of styrene and a minor proportion of butadiene or acrylonitrile or both, the proportion of styrene preferably ranging from 60 to 97 percent and the proportion of butadiene or acrylonitrile or both correspondingly ranging from 40 to 3 percent. In this manner normally hard inelastic resinous thermoplastic interpolymers which are non-rubbery at room temperatures and which have softening points ranging from 150° F. to 300° F. are obtainable.

In more detail, the thermoplastic hard normally inelastic resinous interpolymer used in practicing my invention may be prepared by the emulsion polymerization of styrene and acrylonitrile in the manner disclosed, for example, in U. S. Patent No. 2,140,048, in the presence of an emulsifying agent and a polymerization catalyst. The customary regulators, such as dodecyl mercaptan, used in making synthetic rubber may be included. A convenient recipe is

| | Parts |
|---|---|
| Water | 180–400 |
| Peroxidic catalyst | 0.1– 1.5 |
| Styrene | 65– 80 |
| Acrylonitrile | 20– 35 |
| Butadiene | 0– 15 |
| Emulsifying agent (e. g. soap) | 0.5–150 |
| Regulator (e. g., dodecyl mercaptan) | 0– 1 |

After the autoclave, which is equipped with a stirrer, is charged with mixture it is heated with stirring until there is a 90% or better conversion of the monomeric components to the desired resinous interpolymer. Time and temperature are co-related. The temperature may range from 80° F. to 200° F.; at 95° F. about 10–14 hours are required. The resulting emulsion is withdrawn from the autoclave and coagulated with stirring in a conventional way as by admixture of acid or salt solution. The coagulate is separated in any suitable manner, washed with water and dried to produce a friable powder. The solid resinous interpolymer at room temperature, e. g. 20° C., is completely lacking in elastic (rubberlike) properties; it can be milled into a sheet which is hard, tough and brittle at ordinary room temperatures.

The rubbery interpolymer and the hard inelastic resinous interpolymer may be mixed to a uniform homogeneous mixture in any suitable manner as on a rubber mill or in a Banbury mixer at any suitable elevated temperature, for example at 320 to 350° F. whereupon the resulting mix may be cooled, for example to 150 to 180° F., whereupon other ingredients such as vulcanizing agents, anti-oxidants, vulcanization accelerators and other rubber compounding agents may be admixed if the mixture is to be vulcanized.

The preferred die cutting blocks of my invention have a die-engaging surface of a thermoplastic unvulcanized mixture of a butadiene-acrylonitrile rubbery interpolymer and a styrene-acrylonitrile hard inelastic thermoplastic resinous interpolymer and an interior or underlying portion of a vulcanized thermoset (non-thermoplastic) mixture of a butadiene-acrylonitrile rubbery interpolymer and a styrene-acrylonitrile hard inelastic thermoplastic resinous interpolymer. Less preferably, the entire block may be formed from such a vulcanized mixture, or from such a thermoplastic unvulcanized mixture. In any event I prefer that the die engaging surface be formed from the thermoplastic unvulcanized mixture. The advantage of a block having a thermoplastic surface is that it may be refinished by simply remolding the thermoplastic face.

The die cutting blocks made from the preferred mixture of butadiene-acrylonitrile rubbery interpolymer and styrene-acrylonitrile resinous interpolymer may be made in several forms as follows:

(1) The block may be formed throughout of a thermoplastic (unvulcanized) mixture consisting of the rubbery interpolymer and the resinous interpolymer.

(2) The block may be made throughout of a vulcanized mixture of the rubbery interpolymer and the resinous interpolymer. In making a vulcanized block the mixture is formulated with conventional rubber curatives and other usual rubber compounding ingredients and it is molded under pressure at a temperature sufficient to effect vulcanization.

(3) The cutting block is provided with a vulcanized core as set forth under (2) and external surfaces of thermoplastic material as set forth under (1). This provides a block with thermoplastic die-engaging faces and a vulcanized core so that the face of such a block can be refinished by simply remolding while the vulcanized or thermoset core minimizes any tendency of the block toward warping or bowing in shipment or use.

Where a vulcanized block or a block having a vulcanized core is desired, enough vulcanizing agent, almost invariably sulfur, is incorporated in proportion to the synthetic rubbery interpolymer in the formulation from which the block or core is made to cure this rubbery interpolymer to a soft vulcanized state if it were cured alone.

The usual fillers, softeners and pigments commonly employed in compounding rubber may be added as required for ease of processing and control of physical properties. If desired, plasticizers of the type commonly used for plasticizing synthetic resins may be used in the formulation.

I generally employ the rubbery interpolymer of butadiene and either acrylonitrile or styrene or both and the resinous interpolymer of a major proportion of styrene and a minor proportion of butadiene or acrylonitrile or both in relative proportions of from 10 to 60 percent of the rubbery interpolymer and correspondingly from 90 to 40 percent of the resinous interpolymer.

My preferred mixtures employed for producing the most satisfactory and durable cutting blocks in accordance with my invention are as follows:

(A) Thermoplastic blocks or die-engaging faces are made of from 20 to 50 percent of rubbery butadiene-acrylonitrile copolymer and correspondingly from 80 to 50 percent of hard inelastic styrene-acrylonitrile resinous interpolymer.

(B) Vulcanized die cutting blocks or vulcanized cores of die cutting blocks having a thermoplastic face as under (A) are made from the following formulation:

| | Parts |
|---|---|
| Rubbery butadiene-acrylonitrile interpolymer | 30 to 60 |
| Hard inelastic styrene-acrylonitrile interpolymer | 70 to 40 |
| Sulfur | 0.3 to 6.0 |
| Accelerator | 0.3 to 1.0 |
| Zinc oxide | 0.3 to 6.0 |

In manufacturing the preferred die cutting blocks the sequence of operations may be as follows:

A. Thermoplastic blocks
1. Mix rubber and resin on mill or in Banbury at 320 to 350° F. until smooth and homogeneous.
2. Sheet the mix on a sheet off mill.
3. Cut sheets to size.
4. Ply up sheets to thickness and mold under pressure at 320 to 350° F. until the plies have flowed together to form a homogeneous block.
5. Cool and remove from mold.

B. Vulcanized blocks
1. Mix rubber and resin on mill or in Banbury at 320 to 350° F. until smooth and homogeneous.
2. After the above mix has cooled add curatives on a cold mill and form into sheets.
3. Cut sheets to size.
4. Ply up sheets to thickness and mold under pressure at 320 to 350° F. until the plies have flowed together and the rubber phase has vulcanized.
5. Cool and remove from mold.

The size and shape of the block varies according to the type of cutting machine on which it is used. The size generally runs from 12" x 12" to 36" x 36" and the thickness generally ranges from ¼" to 2".

Typical recipes for thermoplastic and vulcanized stocks used in practicing my invention are:

| | Parts |
|---|---|
| A. *Thermoplastic type* | |
| Rubbery interpolymer of 26 per cent acrylonitrile and 74 per cent butadiene | 40 |
| Hard inelastic resinous interpolymer of 70 per cent styrene and 30 per cent acrylonitrile | 60 |
| Anti-oxidant (such as phenyl alpha naphthylamine) | 1 |
| Pigment (such as red iron oxide) | 2 |
| B. *Vulcanizing type* | |
| Rubbery interpolymer of 35 per cent acrylonitrile and 65 per cent butadiene | 50 |
| Hard inelastic resinous interpolymer of 70 per cent styrene and 30 per cent acrylonitrile | 50 |
| Anti-oxidant | 1 |
| Sulfur | 2 |
| Accelerator (such as mercaptobenzothiazole) | 0.5 |
| Zinc oxide | 2 |
| Pigment | 2 |

If desired, the usual fillers and softeners used with butadiene-acrylonitrile interpolymer synthetic rubbers may be added to mixes A and B to facilitate processing.

Examples of styrene-acrylonitrile interpolymers which are employed in conjunction with rubbery butadiene-acrylonitrile interpolymers in the preferred practice of my invention are resinous binary interpolymers made from monomers consisting of 70 percent styrene and 30 percent acrylonitrile and from 75 percent styrene and 25 percent acrylonitrile and ternary interpolymers of monomeric constituents consisting of 65 percent styrene, 30 percent acrylonitrile and 5 percent butadiene and 69.2 percent styrene, 23.1 percent acrylonitrile and 7.7 percent butadiene. The binary styrene-acrylonitrile resinous interpolymers are usually made from monomers consisting of from 65 to 80 percent of styrene and correspondingly from 35 to 20 percent of acrylonitrile. The ternary styrene-acrylonitrile-butadiene resinous interpolymers are usually made from monomers consisting of 65 to 80 percent of styrene, from 20 to 35 percent of acrylonitrile and up to 15 percent of butadiene.

Die cutting blocks made from the recipes given above under A and B provide excellent cutting surfaces and have great durability. However, both the butadiene-acrylonitrile rubbery interpolymer and the styrene-acrylonitrile resinous interpolymer are expensive. Die cutting blocks which do not possess the outstanding properties of those made from the mixture of butadiene-acrylonitrile rubbery interpolymer and styrene-acrylonitrile resinous interpolymer but which nevertheless have good quality and life as compared with die cutting blocks heretofore employed may be made from mixtures of butadiene-styrene rubbery interpolymer and butadiene-styrene resinous interpolymer. For example, the following compositions may be used in making such less preferred die cutting blocks.

| | Parts |
|---|---|
| C. *Thermoplastic type* | |
| Rubbery interpolymer of butadiene and styrene | 10 to 40 |
| Hard inelastic thermoplastic resinous interpolymer of 75 to 95 per cent styrene and 25 to 5 per cent butadiene | 90 to 60 |
| D. *Vulcanizing type* | |
| Rubbery interpolymer of butadiene and styrene | 20 to 50 |
| Hard inelastic thermoplastic resinous interpolymer of 75 to 95 per cent styrene and 25 to 5 per cent butadiene | 80 to 50 |
| Sulfur | 0.2 to 5 |
| Accelerator | 0.2 to 1.0 |
| Zinc oxide | 0.2 to 5.0 |

The usual fillers and softeners used in GR-S compounding may be added to formulations C and D to facilitate processing. Manufacture of die cutting blocks from the formulations may be carried out in the same manner as given above for the preferred blocks under A and B.

Representative types of resinous interpolymers of styrene and butadiene which may be employed in conjunction with rubbery interpolymers of butadiene and styrene in the less preferred practice of my invention just described include interpolymers made from monomers consisting of 80 percent styrene and 20 percent butadiene, 85 percent styrene and 15 percent butadiene, 90 percent styrene and 10 percent butadiene, 93 percent styrene and 7 percent butadiene, and 95 percent styrene and 5 percent butadiene.

In the drawing Fig. 1 portrays a die cutting block made in accordance with my invention and composed throughout either of a thermoplastic mixture or of a vulcanized mixture as described above. Fig. 2 shows a die cutting block of my invention having a core 1 made of a vulcanized mixture as described above with faces 2 made from the thermoplastic mixtures described above. The laminated block of Fig. 2 may be reversed whereby the life is doubled before it is necessary to remold its faces. In making a laminated block having a vulcanized core and thermoplastic faces such as illustrated in Fig. 2 I prefer to lay the plies of vulcanizable core material 1 and of thermoplastic face material 2 in position in the press and to apply pressure and heat thereto to effect concurrent vulcanization of the core 1 and welding of the faces 2 thereto. By using proportions of sulfur in the lower end of the ranges given above (say 0.3 to 2.0 parts of sulfur per 100 parts of the rubbery butadiene-acrylonitrile interpolymer and the resinous styrene-acrylonitrile interpolymer and 0.2 to 2.0 parts of sulfur per 100 parts of the rubbery butadiene-styrene copolymer and the resinous styrene-butadiene interpolymer) difficulties attributable to migration of vulcanizing components principally sulfur, from the core 1 into the thermoplastic faces 2 are minimized.

In a less preferred method of making a laminated block, I may mold and vulcanize the core 1 before combining it with the thermoplastic face or faces 2. The pre-formed vulcanized core 1 and sheets of the thermoplastic material which is to constitute the face or faces 2 may then be plied together and the assembly molded under pressure at an elevated temperature, of say 320 to 350° F., whereby the material of the face or faces 2 is caused to initimately bond or weld to the surface of the core 1. In this way migration of vulcanizing components from the core 1 into the thermoplastic faces 2, which would otherwise occur, is minimized.

A laminated block such as is portrayed in Fig. 2 should have a thermoplastic die-engaging face of substantial thickness sufficient to prevent its being penetrated by the die even after long usage and sufficient to enable its being remolded when necessary. In practice the thickness of the thermoplastic face will range from 1/8" to 1/4".

The principal advantages of the cutting blocks of my invention are that they provide a die-engaging surface which has excellent qualities for die cutting and that they have a long service life. In one set of tests on clicking machines in a shoe factory blocks made in accordance with the preferred practice of my invention and having a face of a thermoplastic mixture of a rubbery butadiene-acrylonitrile interpolymer and a hard inelastic resinous styrene-acrylonitrile interpolymer and a core of a vulcanized mixture of such a rubbery interpolymer and such a resinous interpolymer, were compared directly with conventional maple blocks. It was found that the cutting rate of the blocks of my invention was 10 to 20 percent faster than on maple blocks. This enabled cutting operators to earn a correspondingly greater amount of money per unit of time when using the blocks of my invention. The increased cutting speed resulted from the fact that the blocks of the present invention gave cleaner cutting at lower cutting pressures. Recutting and trimming were thus considerably reduced. Because of the lower cutting pressure, the dies did not tend to stick in the blocks of the present invention and hence could be reset more quickly for the next cut.

After six months of service in the above test the preferred blocks of the present invention had worn down less than 1/16" in thickness and had worn so evenly that no refinishing was necessary. The maple blocks on the other hand had been refinished by planing an average of 15 times during the six months. The cost of planing a wood block was 75 cents or a total of $11.25 in six months. On the basis of this test it was estimated that a 1" thick block of the present invention would last as long as three maple blocks, each 5" thick. The estimated annual block cost per machine was $38.50 for maple blocks as against $13.00 for the preferred blocks of the present invention.

In another test in a rubber factory using gang dies on a fast acting beam cutting machine, the preferred blocks of the present invention outlasted conventional hard rubber blocks by fifteen times.

In some types of automatic cutting machines, the die strikes repeatedly in the same place on the cutting block. In such cases the blocks of my invention which are constructed entirely of thermoplastic material or which have a thermoplastic face have the unique advantage that they can be refinished by remolding. This remolding can be accomplished by simply putting them in a mold and pressing their faces into contact with heated mold surfaces. This remolding increases the life of the blocks greatly since the refinishing is accomplished without reducing the thickness of the block as by planing.

A further advantage of the die cutting blocks of my invention is that they may be molded to any shape or contour required by a particular design of cutting machine. In the past the shape of the cutting block has been restricted to that which can be machined from wood. Each refinishing of the wood block then required a machining operation to retain the required shape.

Another advantage of the die cutting blocks of my invention is that they are completely insensitive to moisture so that warping in humid atmospheres is not a problem. Another advantage is that they are dimensionally stable at moderately elevated temperatures. Another advantage is that they do not dull the edge of the die.

The principal or binding components of the composition from which the die cutting blocks of my invention are made consist essentially, and almost invariably exclusively, of the rubbery and the resinous interpolymers described herein. The percentage of materials other than these interpolymers such as pigments, fillers, softeners, etc. will usually be relatively small, say not over 10 percent by weight based on the sum of the weights of the rubbery and resinous interpolymers.

All parts and percentages herein are by weight. The term "interpolymer" is used in a non-excluding sense that is as not excluding the presence of small amounts of other monomers which do not detract from the essential characteristics of interpolymers of the named monomers only. For example, in the manufacture of the Buna N component of the preferred blocks of my invention a small amount of 2-chloro-1,3-butadiene may be employed together with 1,3-butadiene without interference with the essential rubbery elastic nature of the resulting interpolymer. Similarly, as stated above, the resinous interpolymer of styrene and acrylonitrile may also contain a minor proportion of combined 1,3-butadiene and likewise, the resinous interpolymer of styrene and butadiene may also contain a small proportion of combined acrylonitrile. In the normal practice of my invention, however, I employ the interpolymers of monomers consisting of those disclosed herein.

Having thus described my invention, what I claim and desire to protect by Letters Patent is:

1. A cutting block having a cutting tool-engaging face composed of a thermoplastic unvulcanized homogeneous composition of which the principal components are a rubbery interpolymer of butadiene and acrylonitrile and a hard normally inelastic resinous thermoplastic interpolymer of from 65 to 80 percent of styrene, from 20 to 35 percent of acrylonitrile and from 0 to 15 percent of butadiene in relative proportions of from 20 to 50 percent by weight of said rubbery interpolymer and correspondingly from 80 to 50 percent by weight of said resinous interpolymer, and an underlying core composed of a vulcanized homogeneous composition of which the principal components are a rubbery interpolymer of butadiene and acrylonitrile and a hard normally inelastic resinous thermoplastic interpolymer of from 65 to 80 percent of styrene, from 20 to 35 percent of acrylonitrile and from 0 to 15 percent of butadiene in relative proportions of from 30 to 60 percent by weight of said rubbery interpolymer and correspondingly from 70 to 40 percent by weight of said resinous interpolymer, said cutting tool-engaging face and said core being coalesced at the interface therebetween, said cutting tool-engaging face being refinishable by pressing against a heated surface and said underlying core minimizing any tendency toward warping and bowing.

2. A cutting block having a cutting tool-engaging face composed of a thermoplastic unvulcanized homogeneous composition of which the binding components consist essentially of a rubbery interpolymer of butadiene and acrylonitrile and a hard normally inelastic thermosplastic resinous interpolymer of monomers consisting essentially of from 65 to 80 percent of styrene and correspondingly from 35 to 20 percent of acrylonitrile in relative proportions of from 20 to 50 percent of said rubbery interpolymer and correspondingly from 80 to 50 percent of said resinous interpolymer, said last-mentioned percentages being by weight based on the sum of the weights of said rubbery interpolymer and said resinous interpolymer, and an underlying core composed of a vulcanized homogeneous composition of which the binding components consist essentially of a rubbery interpolymer of butadiene and acrylonitrile and a hard normally inelastic thermoplastic resinous interpolymer of monomers consisting essentially of from 65 to 80 percent of styrene and correspondingly from 35 to 20 percent of acrylonitrile in relative proportions of from 30 to 60 percent of said rubbery interpolymer and correspondingly from 70 to 40 percent of said resinous interpolymer, said last-mentioned percentages being by weight based on the sum of the weights of said rubbery interpolymer and said resinous interpolymer, said cutting tool-engaging thermoplastic face being of substantial thickness and being coalesced with said core at the interface.

BYRON W. BENDER.

REFERENCES CITED

The following references are of record in the file of this patent:

UNITED STATES PATENTS

| Number | Name | Date |
|---|---|---|
| 204,176 | Weed | May 28, 1878 |
| 412,802 | Simoulin | Oct. 15, 1889 |
| 676,781 | Stimpson | June 18, 1901 |
| 1,399,937 | Denning | Dec. 13, 1921 |
| 1,513,938 | Shea | Nov. 4, 1924 |
| 1,562,162 | Gusdorf | Nov. 17, 1925 |
| 2,120,926 | Baer | June 14, 1938 |
| 2,263,626 | Halbig et al. | Nov. 25, 1941 |
| 2,281,877 | Green | May 5, 1942 |
| 2,439,202 | Daly | Apr. 6, 1948 |

FOREIGN PATENTS

| Number | Country | Date |
|---|---|---|
| 430,282 | France | Aug. 5, 1911 |